United States Patent
Hsieh et al.

(10) Patent No.: US 9,939,947 B2
(45) Date of Patent: Apr. 10, 2018

(54) TOUCH COMMUNICATIONS DEVICE WITH MULTIPLE PARTIAL FIRMWARES AND RELATED METHOD

(71) Applicant: MEDIATEK INC., Hsin-Chu (TW)

(72) Inventors: Ya-Chao Hsieh, Keelung (TW); Ming-Jun Lin, Changhua (TW)

(73) Assignee: MEDIATEK INC., Hsin-Chu (TW)

( * ) Notice: Subject to any disclaimer, the term of this patent is extended or adjusted under 35 U.S.C. 154(b) by 25 days.

(21) Appl. No.: 14/777,506

(22) PCT Filed: Feb. 17, 2015

(86) PCT No.: PCT/CN2015/073229
§ 371 (c)(1),
(2) Date: Sep. 15, 2015

(87) PCT Pub. No.: WO2015/127886
PCT Pub. Date: Sep. 3, 2015

(65) Prior Publication Data
US 2016/0306484 A1    Oct. 20, 2016

Related U.S. Application Data

(60) Provisional application No. 61/944,627, filed on Feb. 26, 2014.

(51) Int. Cl.
*G06F 3/041* (2006.01)
*G06F 3/045* (2006.01)
(Continued)

(52) U.S. Cl.
CPC ............ *G06F 3/0416* (2013.01); *G06F 3/041* (2013.01); *G06F 3/044* (2013.01); *H04B 5/0031* (2013.01);
(Continued)

(58) Field of Classification Search
CPC ... G06F 9/30145; G06F 9/3836; G06F 3/0416
See application file for complete search history.

(56) References Cited

U.S. PATENT DOCUMENTS 7,050,037 B1 * 5/2006 Kuramatsu .......... G09G 3/3406
340/7.61
2009/0067846 A1 * 3/2009 Yu ...................... H04B 10/1143
398/128
(Continued)

FOREIGN PATENT DOCUMENTS

CN      102916729 A      2/2013
CN      103383604 A      11/2013
(Continued)

OTHER PUBLICATIONS

"International Search Report" dated Apr. 28, 2015 for International application No. PCT/CN2015/073229, International filing date: Feb. 17, 2015.

*Primary Examiner* — Nan-Ying Yang
(74) *Attorney, Agent, or Firm* — Han IP Corporation; Andy M. Han (57) ABSTRACT

A touch communications device includes a first touch panel, a touch controller chip and a second storage device. The touch controller chip is capable of executing instructions derived from a firmware to control at least one operation of the first touch panel, wherein the firmware includes a plurality of partial firmwares including at least a first partial firmware and a second partial firmware, and the touch controller chip includes a first storage device capable of storing one of the first partial firmware and the second partial firmware. The second storage device is external to the touch controller chip, wherein the second storage device is capable of storing the other of the first partial firmware and the second partial firmware.

16 Claims, 6 Drawing Sheets

(51) Int. Cl.
*H04B 5/00* (2006.01)
*G06F 3/044* (2006.01)
*H04W 4/00* (2018.01)
*H04M 1/725* (2006.01)

(52) U.S. Cl.
CPC ........ *H04W 4/008* (2013.01); *H04M 1/72525* (2013.01)

(56) References Cited

U.S. PATENT DOCUMENTS

| | | | |
|---|---|---|---|
| 2009/0186580 A1* | 7/2009 | Kim | H04M 1/6066 455/41.3 |
| 2012/0182223 A1* | 7/2012 | Zeng | G06F 3/0416 345/173 |
| 2013/0185482 A1* | 7/2013 | Kim | G06F 3/0605 711/103 |
| 2013/0271423 A1 | 10/2013 | Lin | |
| 2014/0073262 A1* | 3/2014 | Gutierrez | H04M 1/7253 455/67.11 |
| 2014/0199944 A1 | 7/2014 | Ran et al. | |

FOREIGN PATENT DOCUMENTS

| | | |
|---|---|---|
| CN | 103529988 A | 1/2014 |
| TW | I286767 | 9/2007 |

* cited by examiner

TOUCH COMMUNICATIONS DEVICE WITH MULTIPLE PARTIAL FIRMWARES AND RELATED METHOD

CROSS REFERENCE TO RELATED APPLICATIONS

This application claims the benefit of U.S. Provisional Application No. 61/944,627, which was filed on Feb. 26, 2014, and is included herein by reference.

TECHNICAL FIELD

The present invention relates to a touch communications device and related method, and more particularly, to a touch communications device with a plurality of partial firmwares and related method.

BACKGROUND

According to the related art, Near Field Communication (NFC) can be regarded as a contactless identification and interaction technology, and can be used for performing short distance wireless communications between mobile devices, consumer electronic products, personal computers, and/or intelligent electronic devices through a method of near field magnetic coupling (e.g. using the frequency of 13.56 MHz). The users of NFC devices can intuitively exchange information and acquire contents and services with ease.

As the market for portable electronic devices such as mobile phones equipped with NFC functionalities has become mature, they can be used for supporting mobile payment or point of sale (POS). However, as the NFC devices are designed to transmit and receive signals through magnetic coupling, it is typical to implement an inductive card reader or some components having similar functionalities in the aforementioned portable electronic devices such as the mobile phones mentioned above, which may cause the sizes of the portable electronic devices to be increased, and further cause the layouts, the structure arrangement, and the materials of components in the portable electronic devices such as the mobile phones to be limited.

Therefore, some touch communications technologies regarding touch panel devices (e.g. electronic device equipped with touch panels), such as those described in the U.S. Patent Application Publication No. 2011/0304583, the U.S. Patent Application Publication No. US 2013/0147760, the China Patent Application Publication No. CN 102916729 A, are proposed recently, where the touch panels and the driving integrated circuit (IC) in the touch panel devices can be used for performing communications and data transmission. For example, a conventional touch panel device may comprise a touch sensor. In addition, at least one portion of the touch sensor can be at least one portion of the touch panel in the conventional touch panel device, where the touch panel can be a touch panel that does not have the display functionality (e.g. a touch pad), or a touch panel that has the display functionality (e.g. a touch screen). The touch sensor may comprise multiple driving electrodes and sensing electrodes installed on substrates, such as the driving electrodes and the sensing electrodes for forming capacitor structures. At least one of the driving electrodes and the sensing electrodes can be used as transmitting electrodes, and at least one of the driving electrodes and the sensing electrodes can be used as receiving electrodes. Thus, the signals can be transmitted or received by using the electrodes and the driving IC in the conventional touch panel device, to realize touch communications based on electric fields, having no need to implement any inductive card reader or some components having similar functionalities in the conventional touch panel device, where this architecture can significantly reduce the size and save the costs, in comparison with the NFC technology.

Figure 1:
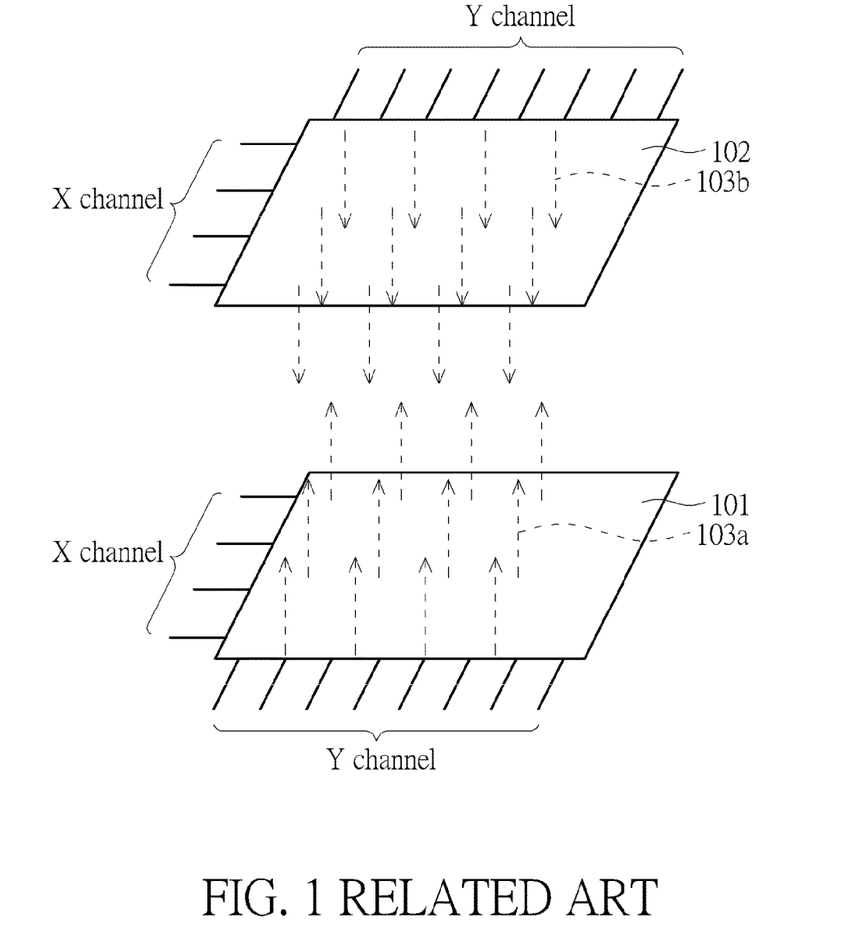
FIG. 1 is a diagram of touch communications between a first touch communications device and a second touch communications device according to the related art.

Please refer to FIG. 1, which illustrates a diagram of touch communications between a first touch panel device 101 and a second touch panel device 102 according to the related art. As shown in FIG. 1, there are near field electric fields 103a and 103b between the first touch panel device 101 and the second touch panel device 102. It should be noted that each of the first touch panel device 101 and the second touch panel device 102 can have the functionalities of transmitting and receiving signals. Based on this touch communications technology, when the first touch panel device 101 transmits signals toward the second touch panel device 102, the communications medium used by the first touch panel device 101 is the electric field portion whose electric field direction is pointing toward the second touch panel device 102 (e.g. the near electric field 103a shown in FIG. 1). In addition, when the second touch panel device 102 transmits signals toward the first touch panel device 101, the communications medium used by the second touch panel device 102 is the electric field portion whose electric field direction is pointing toward the first touch panel device 101 (e.g. the near electric field 103b shown in FIG. 1). Please note that the X channels and the Y channels shown in FIG. 1 may represent the transmitting electrodes and receiving electrodes installed on substrates, such as the transmitting electrodes and the receiving electrodes for forming capacitor structures.

Figure 2:
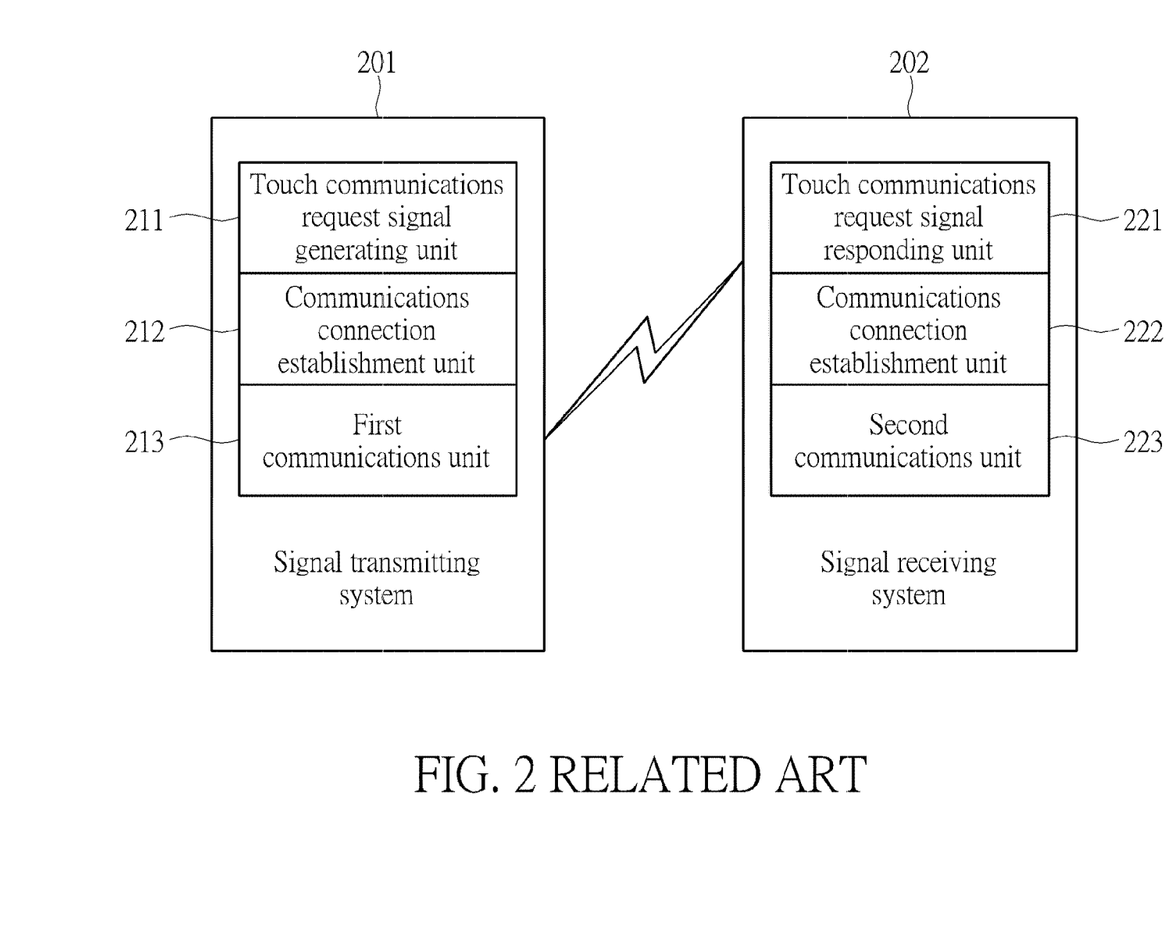
FIG. 2 is a logical block diagram of a touch communications system for realizing the touch communications between the first touch communications device and the second touch communications device shown in FIG. 1 according to the related art.

FIG. 2 is a logical block diagram of a touch communications system for realizing the touch communications between the first touch panel device 101 and the second touch panel device 102 shown in FIG. 1 according to the related art, where the touch communications system may comprise a signal transmitting system 201 and a signal receiving system 202. The first touch panel device 101 shown in FIG. 1 may comprise the signal transmitting system 201 shown in FIG. 2, and the second touch panel device 102 shown in FIG. 1 may comprise the signal receiving system 202 shown in FIG. 2. The signal transmitting system 201 may comprise a touch communications request signal generating unit 211, a communications connection establishment unit 212, and a first communications unit 213. More particularly, the touch communications request signal generating unit 211 may be arranged to generate a touch communications request signal, and to transmit the touch communications request signal to the second touch panel device 102 through the transmitting electrodes of the first touch panel device 101. After the first touch panel device 101 receives a response signal responded by the second touch panel device 102, such as the response signal received through the receiving electrodes of the first touch panel device 101, the communications connection establishment unit 212 may establish a communications connection with the second touch panel device 102 (i.e. the communications connection between the first touch panel device 101 and the second touch panel device 102). After the communications connection establishment unit 212 establishes the communications connection, the first communications unit 213 may transmit communications information and/or data to the second touch panel device 102 through the transmitting electrodes of the first touch panel device 101.

The signal receiving system 202 may comprise a touch communications request signal responding unit 221, a communications connection establishment unit 222, and a second communications unit 223. More particularly, after receiving the touch communications request signal first touch panel device 101, such as the touch communications request signal received through the receiving electrodes of the second touch panel device 102, the touch communications request signal responding unit 221 may respond to the touch communications request signal with a response signal such as that mentioned above, and more particularly, may send the response signal to the first touch panel device 101 through the transmitting electrodes of the second touch panel device 102. After the touch communications request signal responding unit 221 responds to the touch communications request signal of the first touch panel device 101 with the response signal, the communications connection establishment unit 222 may establish the communications connection with the first touch panel device 101 (i.e. the communications connection between the first touch panel device 101 and the second touch panel device 102). After the communications connection establishment unit 222 establishes the communications connection, the second communications unit 223 may receive the communications information and/or data from the first touch panel device 101 through the receiving electrodes of the second touch panel device 102.

Figure 3:
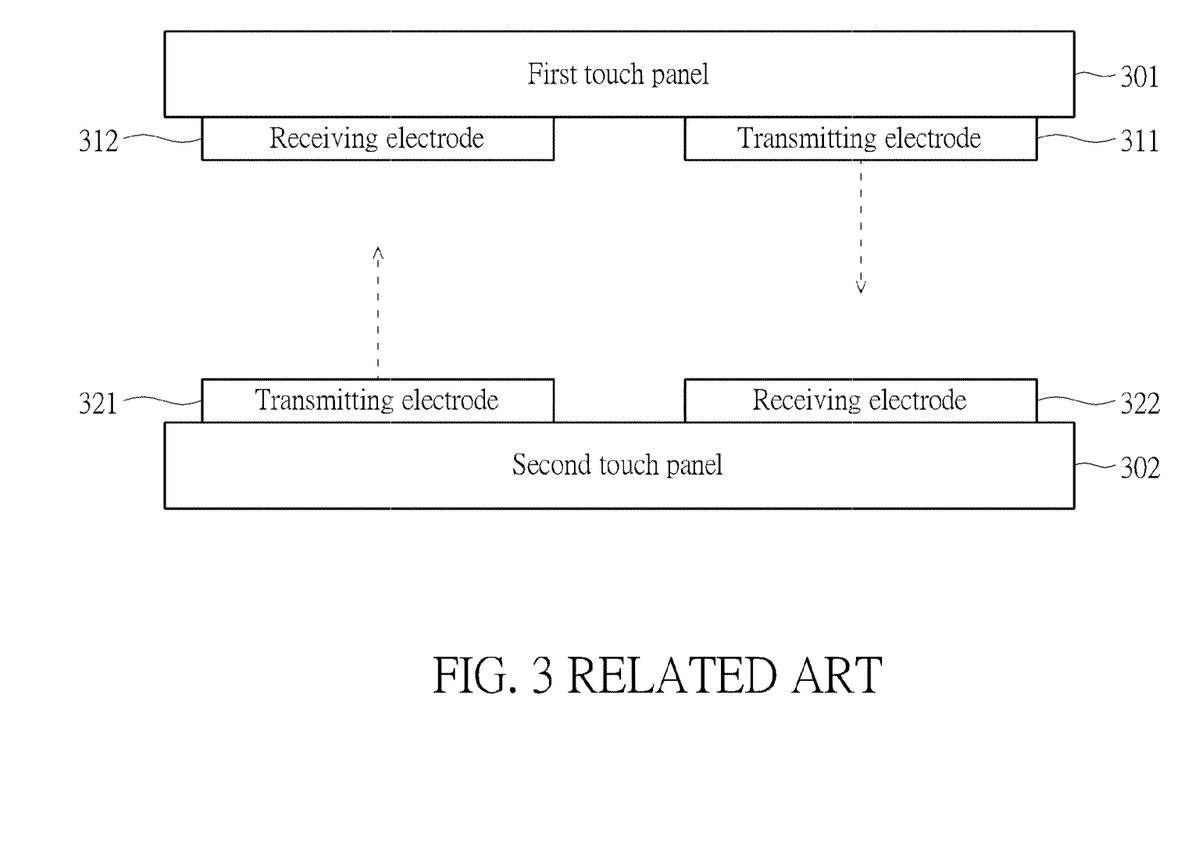
FIG. 3 illustrates a first touch panel of the first touch communications device shown in FIG. 1 and a second touch panel of the second touch communications device shown in FIG. 1 according to the related art.

FIG. 3 illustrates a first touch panel 301 of the first touch panel device 101 shown in FIG. 1 and a second touch panel 302 of the second touch panel device 102 shown in FIG. 1 according to the related art. As shown in FIG. 3, each touch panel of the first touch panel 301 and the second touch panel 302 may comprise a touch sensor (not completely shown in FIG. 3). For example, the touch sensor of the first touch panel 301 may comprise a set of transmitting electrodes installed on at least one substrate of the first touch panel 301 (e.g. the transmitting electrode 311) for transmitting signals, and may comprise a set of receiving electrodes installed on at least one substrate of the first touch panel 301 (e.g. the receiving electrode 312) for receiving signals. In another example, the touch sensor of the second touch panel 302 may comprise a set of transmitting electrodes installed on at least one substrate of the second touch panel 302 (e.g. the transmitting electrode 321) for transmitting signals, and may comprise a set of receiving electrodes installed on at least one substrate of the second touch panel 302 (e.g. the receiving electrode 322) for receiving signals.

Figure 4:
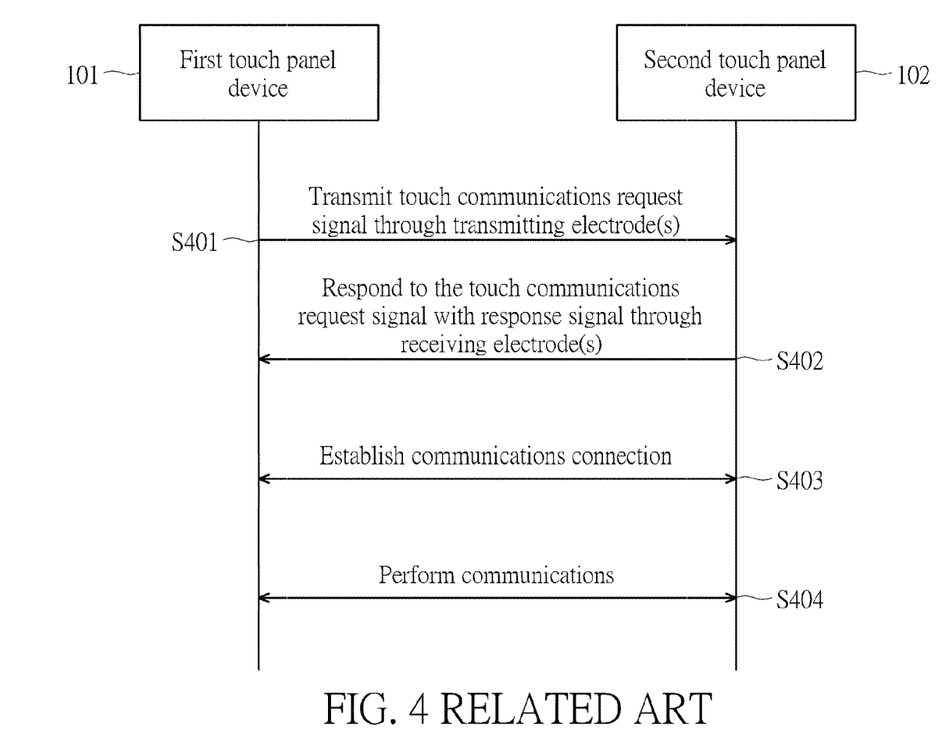
FIG. 4 is a flowchart of a touch communications method according to the related art.

FIG. 4 is a flowchart of a touch communications method according to the related art. First, in Step S401, the touch communications request signal generating unit 211 of the first touch panel device 101 may generate a touch communications request signal such as that mentioned above, and transmit the touch communications request signal to the second touch panel device 102 through the transmitting electrode(s) of the first touch panel device 101. Afterward, in Step S402, the touch communications request signal responding unit 221 of the second touch panel device 102 may respond to the touch communications request signal with a response signal such as that mentioned above through the transmitting electrode(s) of the second touch panel device 102, and more particularly, send the response signal to the first touch panel device 101 through the transmitting electrode(s) of the second touch panel device 102. After the first touch panel device 101 receives the response signal responded by the second touch panel device 102, such as the response signal received through the receiving electrodes of the first touch panel device 101, in Step S403, the communications connection establishment unit 212 of the first touch panel device 101 and the communications connection establishment unit 222 of the second touch panel device 102 may establish a communications connection such as that mentioned above (i.e. the communications connection between the first touch panel device 101 and the second touch panel device 102). As a result, in Step S404, the first touch panel device 101 (more particularly, the first communications unit 213 therein) and the second touch panel device 102 (more particularly, the second communications unit 223 therein) may perform communications as shown in FIG. 4. For example, the first communications unit 213 of the first touch panel device 101 may transmit the communications information and/or data to the second touch panel device 102 through the transmitting electrodes of the first touch panel device 101, and the second communications unit 223 of the second touch panel device 102 may receive the communications information and/or data from the first touch panel device 101 through the receiving electrodes of the second touch panel device 102.

Although the aforementioned touch communications techniques may be used to facilitate data exchange between two touch communications devices, some side effects, are therefore introduced. For example, the wireless data transfer is performed with aid of a touch IC of a touch communications device, which generally has limited resources. More particularly, the storage device size (e.g. ROM size) of the touch IC of the touch communications device is generally insufficient for massive data storage. Adding new functions into the firmware of the touch IC may exceed the storage device size boundary thereof. Further, when performing information transmission between touch panels of two touch communications devices (e.g. the first touch panel 301 of the first touch panel device 101 and the second touch panel 302 of the second touch panel device 102 shown in FIG. 1), the touch panels of the two touch communications devices may continue to display images. That is, the screens may still be turned on when approaching each other, then the information transmission may be interfered by the turned-on touch screens.

Therefore, there is a need for a novel touch communications device capable of solving the issues of insufficient storage device size and the signal interference introduced by the turned-on touch screens.

SUMMARY

In accordance with exemplary embodiments of the present invention, a touch communications device with multiple partial firmwares and a related method are proposed.

According to a first aspect of the present invention, a touch communications device is proposed. The touch communications device includes a first touch panel, a touch controller chip and a second storage device. The touch controller chip is capable of executing instructions derived from a firmware to control at least one operation of the first touch panel, wherein the firmware includes a plurality of partial firmwares including at least a first partial firmware and a second partial firmware, and the touch controller chip includes a first storage device capable of storing one of the first partial firmware and the second partial firmware. The second storage device is external to the touch controller chip, wherein the second storage device is capable of storing the other of the first partial firmware and the second partial firmware.

According to a second aspect of the present invention, a method for controlling a touch communications device having a first touch panel and a touch controller chip is proposed. The method includes: utilizing the touch controller chip to execute instructions derived from a firmware to control at least one operation of the first touch panel, wherein the firmware includes a plurality of partial firmwares including at least a first partial firmware and a second partial firmware, one of the first partial firmware and the second partial firmware is stored in a first storage device of the touch controller chip, and another of the first partial firmware and the second partial firmware is stored in a second storage device external to the touch controller chip.

These and other objectives of the present invention will no doubt become obvious to those of ordinary skill in the art after reading the following detailed description of the preferred embodiment that is illustrated in the various figures and drawings.

DETAILED DESCRIPTION

Certain terms may be used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" may be used in an open-ended fashion, and thus should be interpreted to mean "include, but not limited to . . . ". Also, the term "couple" may be intended to mean either an indirect or direct electrical connection. Accordingly, if one device is coupled to another device, that connection may be through a direct electrical connection, or through an indirect electrical connection via other devices and connections.

Figure 5:
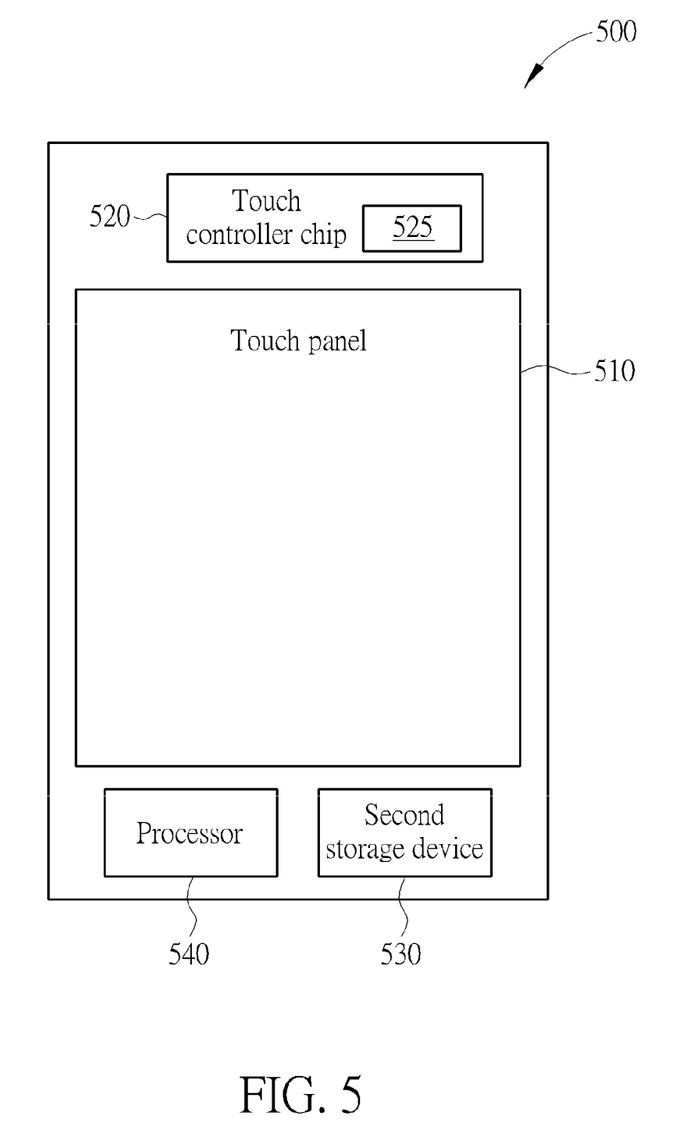
FIG. 5 is a diagram illustrating a touch communications device according to a first embodiment of the present invention.

Refer to FIG. 5, which is a diagram illustrating a touch communications device 500 according to a first embodiment of the present invention. As shown in FIG. 5, the touch communications device 500 may include a touch panel 510, a touch controller chip 520, a second storage device 530 and a processor 540. The touch controller chip 520 may be realized as a touch integrated circuit (IC), and may be capable of executing instructions derived from a firmware to control at least one operation of the touch panel 510, wherein the firmware of the touch communications device 500 may include a plurality of (e.g. at least two) partial firmwares, wherein the plurality of partial firmwares may include at least a first partial firmware and a second partial firmware. The functions and/or operations corresponding to different partial firmwares may be different or at least partly the same. For one example, partial firmware A may correspond to operation A and partial firmware B may correspond to operation B, while the operation A is different from the operation B. For another example, partial firmware A may correspond to operations C and D, while partial firmware B may correspond to operation C (the same as the operation C corresponding to partial firmware A) and operation E (different from the operations C and D corresponding to partial firmware A). The touch controller chip 520 may comprise a first storage device 525 capable of storing one of the first partial firmware and the second partial firmware. The first partial firmware and the second partial firmware may include different commands to achieve various functions. The second storage device 530 may be external to the touch controller chip 520, wherein the second storage device 530 is capable of storing the other of the first partial firmware and the second partial firmware. In general, the storage space of the second storage device 530 may be larger than that of the first storage device 525. However, according to design requirements, the storage space of the second storage device 530 may be larger than, equal to or smaller than the storage space of the first storage device 525.

The second storage device 530 may be utilized to store the first partial firmware, while the first storage device 525 of the touch controller chip 520 may be utilized to store the second partial firmware. In another example, the second storage device 530 may be utilized to store the second partial firmware, while the first storage device 525 of the touch controller chip 520 may be utilized to store the first partial firmware. The touch controller chip 520 can switch among execution of the plurality of partial firmwares. Since each of the partial firmwares may occupy less storage space than the entire firmware, the touch controller chip 520 can execute instructions derived from the entire firmware by switching among execution of the plurality of partial firmwares without the need of a large storage device for storing the entire firmware.

For example, when a touch panel of another touch communications device is close to or in contact with the touch panel 510 of the touch communications device 500, the touch controller chip 520 may execute the first partial firmware to establish a communications connection between the touch communications device and the other touch communications device; and when the communications connection is established, the touch controller chip 520 may switch to execution of the second partial firmware for information transmission between the touch communications device and the other touch communications device.

In this embodiment, the entire functionality of the firmware may be implemented by two or more partial firmwares (e.g. the aforementioned first and second firmwares), wherein at least one partial firmware with partial functionalities may be stored in the second storage device 530. The functions and/or operations corresponding to different partial firmwares may be different or at least partly the same. Switching among the partial firmwares may be performed according to different required operations. For example, the first partial firmware may be employed to perform at least one operation for normal case(s), and the second partial firmware may be employed to perform data/information transmission between the two touch communications devices (e.g. the touch communications device 500 and another touch communications device) close to or in contact with each other. The aforementioned normal case(s) may refer to the touch and/or pairing operations. The touch operation may include a typical touch sensitive function of a touch panel. The pairing operation may include detecting if another device is close to or in contact with the touch communications device and/or helping establishment of a touch communications connection between the touch communications device and the other device if the other device is also a touch communications device. The partial firmware responsible for the normal case(s) may be performed first, so that another partial firmware is able to perform the data/information transmission between the two touch communications devices close to or in contact with each other. Please note that, although in the illustrations of this embodiment, the first partial firmware is employed to perform the at least one operation for normal case(s) and the second partial firmware is employed to perform data/information transmission between the two touch communications devices close to or in contact with each other, the respective functions of the first partial firmware and the second partial firmware can be exchanged. Further, the operations corresponding to the partial firmwares are not limited by the scenarios illustrated above, more operations may be incorporated therein.

For example, the first partial firmware may include codes/commands related to execution for the normal case, and the second partial firmware may include codes/commands related to execution for the data transfer mode where the two touch communications devices are close to or in contact with each other.

The processor 540 may be an application processor, but the present invention is not limited thereto. In one embodiment, the second storage device 530 may be accessible to the processor 540. Thus for the touch controller chip 520 to switch among execution of partial firmwares, the processor 540 may help store the partial firmware(s) stored in the second storage device 530 into the first storage device 525 for the touch controller chip 520 to execute. In another embodiment, the second storage device 530 may be accessible to the touch controller chip 520, then the touch controller chip 520 may load partial firmware(s) from the second storage device 530 into the first storage device 525 to execute, or execute the partial firmware(s) stored in the second storage device 530 directly. In still another embodiment, the second storage device 530 may be accessible to a component (e.g. direct memory access (DMA)) other than the processor 540 and the touch controller chip 520, and the partial firmware(s) stored in the second storage device 530 may be loaded into the first storage device 525 by the component. The embodiments mentioned above are for illustrative purpose only. Any method capable of helping the touch controller chip 520 to switch among execution of partial firmwares should fall within the scope of the invention.

The above multi-firmware configuration is capable of solving the issue of insufficient storage device size. Specifically, firmware with extra functions occupying a relatively large storage space may still be properly executed by switching among partial firmwares stored in different storage devices.

Please note that the firmware of the touch communications device 500 of the present invention is not limited to include the first partial firmware and second partial firmware only. For example, the touch communications device 500 may further include a third partial firmware, capable of checking authentication before, during or after the pairing operation between the touch communications device 500 and another touch communications device. The third partial firmware may be stored in the first storage device 525, the second storage device 530, or another storage device, e.g. a third storage device (not shown). The touch communications device 500 of the present invention is not limited to include two storage devices only.

Another embodiment of the present invention provides a scheme capable of reducing signal interference introduced due to turned-on screens during the data transfer between the two touch communications devices. In one embodiment, when a touch communications connection between the two touch communications devices (e.g. the touch communications device 500 and another touch communications device) has been established (or the two touch communications devices are paired), the touch controller chip 520 and/or the processor 540 may be informed of the connected state. The touch controller chip 520 and/or the processor 540 of the touch communications device 500 may black out (e.g. disable) the screen of the touch panel 510 of the touch communications device 500, thus avoiding possible signal interference upon the information transmission between the two touch communications devices introduced by the functioning screens. In another embodiment, the screen of the touch panel 510 of the touch communications device 500 may be turned off as long as another touch communications device is close to or in contact with the touch communications device 500. Then, after the information transmission between the two touch communications devices is accomplished, the touch controller chip 520 and/or the processor 540 of the touch communications device 500 may be informed that the information transmission is accomplished and may turn on the screen of the touch panel 510.

The user of the touch communications device 500 may not watch the screen since the two touch communications devices may be close to or in contact with each other during the signal transmission, turning off the screen of the touch communications device 500 may not substantially affect the user experience. The present invention is therefore capable of reducing the signal interference effect and even power consumption without deteriorating a user experience.

Figure 6:
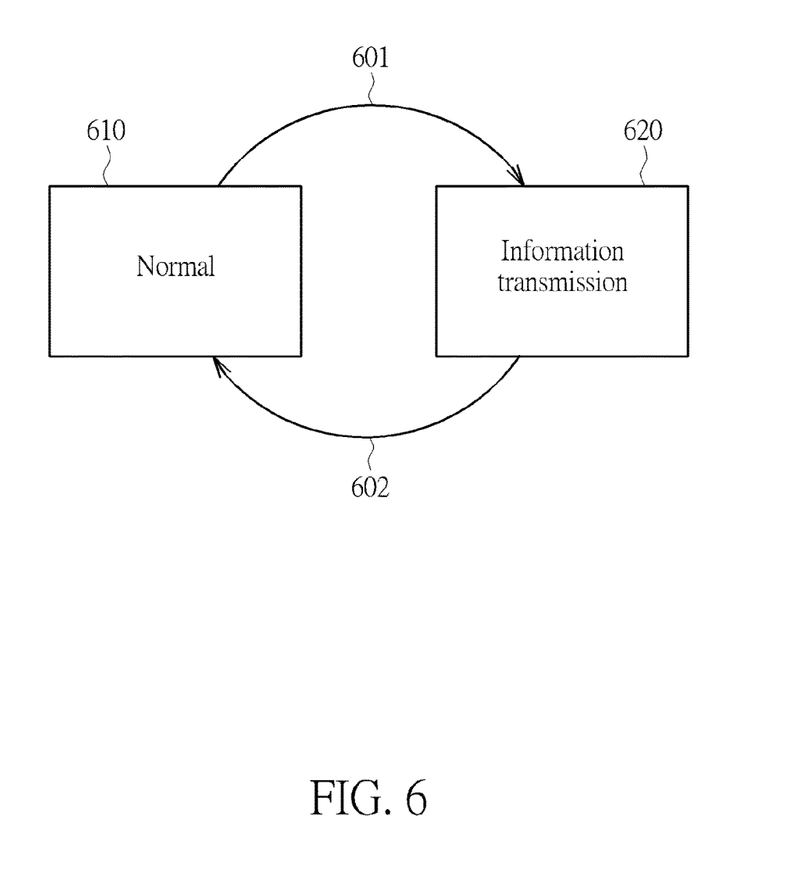
FIG. 6 is a diagram illustrating the firmware switching of the touch communications device shown in FIG. 5.

FIG. 6 is a diagram illustrating the partial firmware switching of the touch communications device 500 shown in FIG. 5. Please note that although only two partial firmwares are shown in FIG. 6, more partial firmwares can be adopted according to different design requirements. The partial firmware 610 may represent a partial firmware for execution of operation(s) in normal case (e.g. touch and/or pairing operations), and the partial firmware 620 may represent a partial firmware for execution of information transmission between the touch communications device 500 and another touch communications device when the touch panel of the other touch communications device is close to or in contact with the touch panel 510 of the touch communications device 500. The touch operation may include a typical touch sensitive function of a touch panel. The pairing operation may include detecting if another device is close to or in contact with the touch communications device and/or helping establishment of a touch communications connection between the touch communications device and the other device if the other device is also a touch communications device. When the user(s) places the touch communications device 500 and the other touch communications device to be close to or in contact with each other, the touch controller chip 520 may execute the partial firmware 610 to perform pairing function to establish a communications connection between the touch communications device 500 and the other touch communications device. Then the user(s) may be notified that the connection is established as long as the authentication passes. The touch controller chip 520 may then switch from execution of partial firmware 610 to execution of partial firmware 620 (Step 601), e.g. the touch controller chip 520 switches to execution of the partial firmware 620 for information transmission between the touch communications device 500 and the other touch communications device. During the information transmission, the screen of the touch panel 510 may be turned off to reduce possible interference and even reduce power consumption. Next, when the information transmission between the two touch communications devices is accomplished, The touch controller chip 520 may then switch from execution of the partial firmware 620 to execution of the partial firmware 610 (Step 602). For example, the touch controller chip 520 may switch to execution of the first partial firmware to recover the operation(s) of the touch communications device 500 in normal case (e.g. touch and/or pairing functions). Further, the screen of the touch panel 510 may be turned on after the information transmission between the two touch communications devices is accomplished or after step 602.

User notification(s) may be generated to notify user that the information transmission is accomplished and/or the touch communications device is switching/has switched back to normal mode. So that the user may be aware the procedure is completed and can move the touch communications device 500 and the other touch communications device away from each other. The notification may be via sound, vibration, flash or in any other form. The user notification may be generated after or during the touch controller chip 520 switches to execution of the first partial firmware (e.g. switching to partial firmware 610 from partial firmware 620). This is merely for illustrative purposes, and not meant to be a limitation to the present invention. In some embodiments, the user notification may be generated before the touch controller chip 520 starts to switch to execution of the first partial firmware (e.g. the partial firmware 610). By generating user notification during the touch controller chip 520 switches to execution of the first partial firmware or before the touch controller chip 520 starts to switch to execution of the first partial firmware, the user may retake control of the touch communications device 500 earlier, thus the user experience may be improved.

It should be noted that the touch panel mentioned in the exemplary embodiments above can be a touch panel that does not have the display functionality (e.g. a touch pad), or a touch panel that has the display functionality (e.g. a touch screen). Besides, a first touch communications device close to or in contact with a second touch communications device can mean that the distance between a first touch panel of the first touch communications device and a second touch panel of the second touch communications device is not larger than a predetermined distance. For example, if the predetermined distance is 2 cm, the first touch communications device close to or in contact with the second touch communications device can mean that the distance between the first touch panel and the second touch panel is not larger than 2 cm. This is for illustrative purpose only, but not a limitation. The predetermined distance may vary with the touch panel, its driving IC, and the design of the electronic device, and may be greater, such as 5 cm, or may be less, such as 2 mm, and so on.

To summarize, by implementing functionalities by a plurality of partial firmwares, the problem of the touch controller chip 520 not having sufficient storage device size (e.g. ROM size) may be solved. The resources of the processor 540 (e.g. an application processor) or any other storage device of the touch communications device 500 may be utilized to store one or more partial firmwares. Further, an embodiment of the preset invention also provides a scheme capable of saving time for the user, by properly adjusting the rollback timing to save time for the user. Furthermore, the implementation of the present invention may not require additional hardware, whereas the standard NFC technique must add a new NFC controller for wireless communication. The implementation complexity is therefore greatly reduced.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A touch communications device, comprising:
   a first touch panel;
   a touch controller chip, capable of executing instructions derived from a firmware to control at least one operation of the first touch panel, wherein the firmware comprises a plurality of partial firmwares including at least a first partial firmware and a second partial firmware, and wherein the touch controller chip comprises a first storage device capable of storing one of the first partial firmware and the second partial firmware; and
   a second storage device, external to the touch controller chip, wherein the second storage device is capable of storing the other of the first partial firmware and the second partial firmware,
   wherein the touch controller chip is further capable of switching among execution of the plurality of partial firmwares,
   wherein when a second touch panel of another touch communications device is close to or in contact with the first touch panel, the touch controller chip is capable of executing the first partial firmware to establish a communications connection between the touch communications device and the another touch communications device, and
   wherein when the communications connection is established, the touch controller chip is capable of switching to execution of the second partial firmware for information transmission between the touch communications device and the another touch communications device.

2. The touch communications device of claim 1, further comprising:
   a processor,
   wherein the second storage device is accessible to the processor.

3. The touch communications device of claim 1, wherein when the information transmission between the touch communications device and the another touch communications device is accomplished, the touch controller chip is capable of switching to execution of the first partial firmware.

4. The touch communications device of claim 3, wherein user notification is generated during the touch controller chip switching to execution of the first partial firmware.

5. The touch communications device of claim 3, wherein user notification is generated before the touch controller chip starts switching to execution of the first partial firmware.

6. The touch communications device of claim 1, wherein the first partial firmware is capable of performing touch and/or pairing operations, and the second partial firmware is capable of performing information transmission.

7. The touch communications device of claim 6, wherein a screen of the first touch panel is turned off during the information transmission.

8. The touch communications device of claim 6, wherein the plurality of partial firmwares further include a third partial firmware capable of checking authentication before pairing the touch communications device to the another touch communications device.

9. A method for controlling a touch communications device having a first touch panel and a touch controller chip, comprising:
utilizing the touch controller chip to execute instructions derived from a firmware to control at least one operation of the first touch panel, wherein the firmware comprises a plurality of partial firmwares including at least a first partial firmware and a second partial firmware; and
switching among execution of the plurality of partial firmwares,
wherein switching among execution of the plurality of partial firmwares comprises:
when a second touch panel of another touch communications device is close to or in contact with the first touch panel, executing the first partial firmware to establish a communications connection between the touch communications device and the another touch communications device; and
when the communications connection is established, switching to execution of the second partial firmware for information transmission between the touch communications device and the another touch communications device,
wherein one of the first partial firmware and the second partial firmware is stored in a first storage device of the touch controller chip, and
wherein another of the first partial firmware and the second partial firmware is stored in a second storage device external to the touch controller chip.

10. The method of claim 9, further comprising:
storing one of the first partial firmware and the second partial firmware into a first storage device of the touch controller chip; and
storing the other of the first partial firmware and the second partial firmware into a second storage device external to the touch controller chip.

11. The method of claim 9, wherein switching among execution of the plurality of partial firmwares comprises:
when the information transmission between the touch communications device and the another touch communications device is accomplished, switching to execution of the first partial firmware.

12. The method of claim 11, wherein user notification is generated during switching to execution of the first partial firmware.

13. The method of claim 11, wherein user notification is generated before switching to execution of the first partial firmware is started.

14. The method of claim 9, wherein the first partial firmware is capable of performing touch and/or pairing operations, and wherein the second partial firmware is capable of performing information transmission.

15. The method of claim 14, further comprising:
turning off a screen of the first touch panel during the information transmission.

16. The method of claim 14, wherein the plurality of partial firmwares further include a third partial firmware capable of checking authentication before pairing the touch communications device to the another touch communications device.

* * * * *